United States Patent
Lejeune et al.

(10) Patent No.: US 9,290,088 B2
(45) Date of Patent: Mar. 22, 2016

(54) DEVICE FOR REMOVABLY ATTACHING A BATTERY OF A MOTOR VEHICLE

(75) Inventors: Francois-Xavier Lejeune, Meudon (FR); Joel Thevenart, Plaisir (FR); Emmanuel Richez, Autouillet (FR); Mickael Turpin, Verrieres le Buisson (FR)

(73) Assignee: RENAULT s.a.s., Boulogne Billancourt (FR)

( * ) Notice: Subject to any disclaimer, the term of this patent is extended or adjusted under 35 U.S.C. 154(b) by 187 days.

(21) Appl. No.: 13/516,768

(22) PCT Filed: Nov. 25, 2010

(86) PCT No.: PCT/FR2010/052536
§ 371 (c)(1),
(2), (4) Date: Jun. 18, 2012

(87) PCT Pub. No.: WO2011/083220
PCT Pub. Date: Jul. 14, 2011

(65) Prior Publication Data
US 2012/0255800 A1 Oct. 11, 2012

(30) Foreign Application Priority Data
Dec. 21, 2009 (FR) .................................. 09 59272

(51) Int. Cl.
*F16B 21/02* (2006.01)
*B60K 1/04* (2006.01)
*B60L 11/18* (2006.01)
(Continued)

(52) U.S. Cl.
CPC ............... *B60K 1/04* (2013.01); *B60L 11/1822* (2013.01); *F16B 21/02* (2013.01); *H01M 2/1083* (2013.01); *F16B 2005/0671* (2013.01); *Y02T 10/7005* (2013.01); *Y02T 10/7072* (2013.01); *Y02T 90/124* (2013.01); *Y02T 90/14* (2013.01)

(58) Field of Classification Search
CPC ............ F16B 21/02; F16B 21/04; F16B 5/10; F16B 2005/0671
USPC .............. 180/65.1, 65.27, 68.5, 2.1; 320/109, 320/107; 411/999, 552, 105, 349, 347, 350
See application file for complete search history.

(56) References Cited

U.S. PATENT DOCUMENTS 2,839,808 A * 6/1958 Zahodiakin ................... 411/551
3,294,140 A * 12/1966 Cosenza ....................... 411/105
(Continued)

FOREIGN PATENT DOCUMENTS

WO 2008 128991 10/2008

OTHER PUBLICATIONS

U.S. Appl. No. 13/812,396, filed Jan. 25, 2013, Lejeune, et al.
(Continued)

*Primary Examiner* — Katy M Ebner
*Assistant Examiner* — Emma K Frick
(74) *Attorney, Agent, or Firm* — Oblon, McClelland, Maier & Neustadt, L.L.P.

(57) ABSTRACT

A device for removably attaching a battery of a motor vehicle, including an upper portion including a mechanism for attaching onto a motor vehicle, and a lower portion including a mechanism for connecting to the battery, and including a latch linked with a rotational axis and linked to a piston on which a resilient mechanism acts, so as to enable the two upper and lower portions to be locked together and unlocked from each other by a translation and rotation of the latch.

12 Claims, 3 Drawing Sheets

(51) Int. Cl.
*H01M 2/10* (2006.01)
*F16B 5/06* (2006.01)

(56) References Cited

U.S. PATENT DOCUMENTS

| | | | | |
|---|---|---|---|---|
| 3,343,581 A | * | 9/1967 | Martin et al. | 411/349 |
| 3,827,110 A | * | 8/1974 | Dzus et al. | 411/555 |
| 4,087,895 A | * | 5/1978 | Etienne | 29/252 |
| 4,207,655 A | * | 6/1980 | MacMaster | 411/350 |
| 4,227,287 A | * | 10/1980 | Gunther | 411/552 |
| 4,236,562 A | * | 12/1980 | Molina | 411/103 |
| 4,308,646 A | * | 1/1982 | Schenk | 411/554 |
| 4,442,571 A | * | 4/1984 | Davis et al. | 411/552 |
| 4,653,970 A | * | 3/1987 | Ballantyne | 411/555 |
| 5,688,093 A | * | 11/1997 | Bowers | 411/552 |
| 5,779,422 A | * | 7/1998 | Petignat | 411/551 |
| 6,170,304 B1 | | 1/2001 | Ohta | |
| 6,267,543 B1 | * | 7/2001 | David et al. | 411/552 |
| 7,070,374 B2 | * | 7/2006 | Womack et al. | 410/104 |
| 7,281,889 B2 | * | 10/2007 | Anderson et al. | 410/104 |
| 7,401,995 B2 | * | 7/2008 | Senakiewich, II | 403/374.4 |
| 7,607,553 B2 | * | 10/2009 | Weber | 220/328 |
| 7,997,843 B2 | * | 8/2011 | Bowers et al. | 411/533 |
| 8,164,300 B2 | * | 4/2012 | Agassi et al. | 320/104 |
| 8,491,246 B2 | * | 7/2013 | Chao et al. | 411/349 |
| 8,511,413 B2 | * | 8/2013 | Ojima et al. | 180/68.5 |
| 8,517,132 B2 | * | 8/2013 | Heichal et al. | 180/68.5 |
| 8,657,545 B2 | * | 2/2014 | Magno et al. | 411/349 |
| 2007/0108877 A1 | | 5/2007 | Bergmann et al. | |
| 2009/0028660 A1 | * | 1/2009 | Csik et al. | 411/103 |
| 2009/0074539 A1 | * | 3/2009 | Mahdavi | 411/533 |
| 2010/0145717 A1 | * | 6/2010 | Hoeltzel | 705/1.1 |
| 2012/0040219 A1 | * | 2/2012 | Cappellotti et al. | 429/99 |
| 2013/0180791 A1 | * | 7/2013 | Lejeune et al. | 180/68.5 |

OTHER PUBLICATIONS

French Search Report Issued Apr. 13, 2010 in FR 09 59272 Filed Dec. 21, 2009.
International Search Report Issued Apr. 21, 2011 in PCT/FR10/52536 Filed Nov. 25, 2010.

* cited by examiner

DEVICE FOR REMOVABLY ATTACHING A BATTERY OF A MOTOR VEHICLE

BACKGROUND

The present invention relates to a device for removably attaching a container of energy that powers an engine or motor that propels a motor vehicle and to a method of mounting such an energy container. It also relates to a motor vehicle as such incorporating such a device for attaching a container of power supply energy.

Certain motor vehicles, such as electric or hybrid vehicles, comprise a container of energy that powers a propulsion engine or motor, such as an electric battery that powers an electric motor. When the level of energy remaining in this battery is low it has to be recharged or replaced with another battery that is charged. The batteries may, for example, be exchanged in a station similar to a service station in which a motor vehicle can have its tank filled with fuel.

Document U.S. Pat. No. 5,612,606 discloses a station for exchanging the electric battery that powers a motor that propels an electric vehicle and a method for performing such an exchange. In the exchange station described, the driver positions the vehicle approximately in a rail, against a longitudinal end stop with respect to equipment belonging to the station. After that, in phases that are fairly automatic, mobile means for removing the electric battery and for assembling the new battery in the vehicle position themselves relative to the vehicle using sensors. The number of sensors and electronic means required for the operation of such a station makes it not very reliable and means that it cannot operate very robustly. Document U.S. Pat. No. 5,998,963 likewise describes another battery-exchange station for a motor vehicle.

To make more widespread use of battery-powered motor vehicles easier, it is necessary to offer a reliable and robust system for operating on the vehicle when its battery is low on charge.

BRIEF SUMMARY

Thus, it is a general objective of the invention to provide a solution that addresses this requirement and overcomes the aforementioned disadvantages of the methods known from the prior art.

To this end, the invention relies on a device for removably attaching a motor vehicle battery, characterized in that it comprises an upper part comprising a means of attachment to a motor vehicle and a lower part comprising a means of connection to the battery, and in that it comprises a lock connected to a rotation spindle and connected to a piston on which there acts an elastic means, so as to allow the two, upper and lower, parts to be locked together and unlocked from one another by a translational and a rotational movement of the lock.

The means of connection to the battery belonging to the lower part may consist of a flat surface on which the battery can rest vertically.

The elastic means may comprise at least one spring, or at least one spring comprising spring washers of the "Belleville" type.

The piston may form a plateau which comes to rest against a stop, separate from the plateau, and secured to the rotation spindle.

The rotation spindle may be substantially vertical and the piston may be capable of a translational movement substantially parallel to the rotation spindle.

The lower part may comprise at least one attachment element for a tool capable of reacting load when the device is operated using this tool.

The upper part may comprise a substantially flat lower surface comprising an opening onto a hollow volume forming a lock receptacle, and the lower part may comprise the lock, the spindle, the piston and the elastic means.

This particular configuration allows the use of fairly compact tools for attaching electric batteries.

The lower part may comprise a volume in which the rotation spindle is mounted with the ability to rotate, within which the piston is located, within which is located the elastic means connected to the piston so as to exert a force that opposes the upward movement of the piston.

The lower part may comprise an upper surface comprising an opening through which the rotation spindle passes, the lock being situated above this opening.

The elastic means may apply a tension greater than or equal to 8000 N on the lock and/or the coefficient of friction between the lock and the part in contact with it in the locked configuration may be greater than or equal to 0.15.

The invention also relates to a lower part of a device for removably attaching a motor vehicle battery, characterized in that it comprises a means of connection to a battery, and in that it comprises a lock connected to a rotation spindle and connected to a piston on which there acts an elastic means, so as to allow locking and unlocking with respect to an upper part by a translational and a rotational movement of the lock.

The invention also relates to a motor vehicle comprising a power supply battery, characterized in that it comprises at least one device as described hereinabove for removably attaching its battery.

The upper part of the at least one removable-attachment device may be fixed under the chassis or under the luggage compartment of the motor vehicle.

BRIEF DESCRIPTION OF THE DRAWINGS

These objects, features and advantages of the present invention will be explained in greater detail in the following description of one particular embodiment which is given by way of nonlimiting example with reference to the attached figures in which.

DETAILED DESCRIPTION

The invention applies to any vehicle comprising a container of power supply energy positioned in the rear luggage compartment or under the chassis. In the remainder of the description, the mounting of an energy container is described via the description of the mounting of an electric battery that powers a drive motor of a vehicle. However, the invention applies to any type of power supply container.

The concept of the invention relies on a removable attachment of the battery to the motor vehicle so that it can easily be taken off so that it can be exchanged and/or recharged when necessary, while at the same guaranteeing that it will be held reliably and securely in place when the vehicle is in transit.

Figure 1:
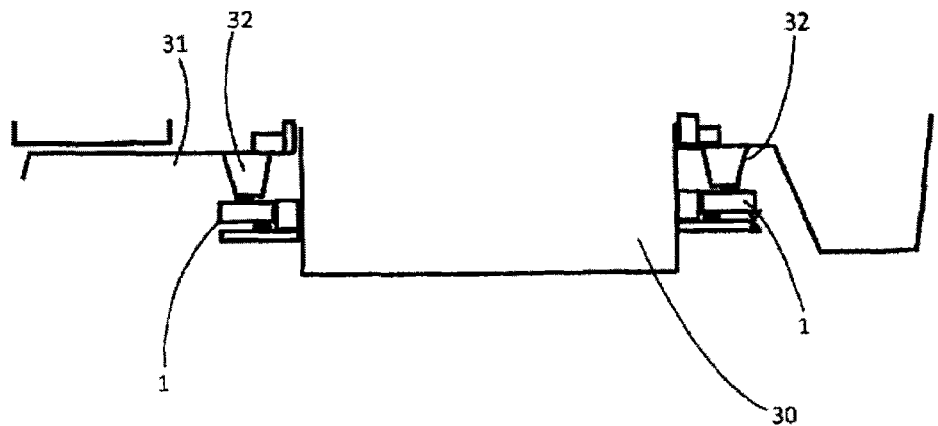
FIG. 1 schematically depicts the system for removably attaching a battery to a motor vehicle according to one embodiment of the invention.

FIG. 1 thus depicts a battery tray 30, consisting of a substantially parallelepipedal support in which the battery is housed, fixed under the chassis 31 of a motor vehicle via several removable-attachment devices 1. In this embodiment, one set of attachment devices 1 is used, as many times as necessary, depending on the characteristics (mass, geometry, center of gravity, etc.) of the battery tray, which in this non-limiting embodiment makes a total of four devices 1. These devices are also fixed at particular locations 32 arranged under the chassis 31 of the motor vehicle. As an alternative, the battery could be placed in a tray of a different shape or could be connected directly to one or more removable attachment devices 1. In addition, four attachment devices have been used, but any other number greater than or equal to 1 may also be suitable.

As is notably visible in FIGS. 2 to 9, the removable-attachment device 1 comprises an upper part 2, secured to a motor vehicle that has not been depicted, as explained hereinabove, comprising a flat upper surface comprising attachment means 4 which are suited to being attached to the motor vehicle, and a flat lower part 6 comprising an opening 5 forming a female connecting part suited to collaboration with a lock 15.

This structure thus forms a hollow volume 7 which is accessible via the lower opening 5, like a lock receptable.

The removable-attachment device 1 additionally comprises a lower part 10, distinct and disconnectable from the upper part 2, and intended for connection with the battery or indirectly for connection with a battery tray 30. For that purpose it comprises flat parts 12 serving to support the battery tray 30 which rests on them. It comprises a hollow structure defining a hollow housing 17 through which notably can pass a spindle 11 which crosses substantially the entire height thereof, in a vertical direction, crossing it through an upper opening 13, comprising a lock 15 in its upper part positioned above the upper face 18 of the lower part 10 in which the opening 13 is made. The lower end of the spindle 11 is connected to a piston 14, accessible from the lower face of the lower part 10 of the device 1. An elastic means 16 is created in the hollow volume 17 and acts between the body of this lower part 10 and the piston 14 so as to be able to generate a vertical load on the piston 14. This load allows the lock 15 to be preloaded, thus pressing the lock 15 firmly against the flat lower part 6, it thus being possible for the latter to be pressed firmly against the upper face 18. That ensures that an operating tension within the system is greater than or equal to 8000 N. This is because since the battery weighs several hundred kilograms, such operating tension prevents the battery, under normal driving conditions and/or in the event of an impact, from knocking against the internal wall of the vehicle.

Finally, one or more attachment points 19, in the shape of mushrooms, extend under the lower part of the device and are suitable for the attachment of a tool for automatically actuating the device in order to lock or unlock a battery with respect to a motor vehicle.

FIGS. 2 to 6 illustrate the various steps of a method of mounting a battery on a motor vehicle using a removable-attachment device according to the invention, as described hereinabove.

Figures 2, 3, 4, 5, 6:
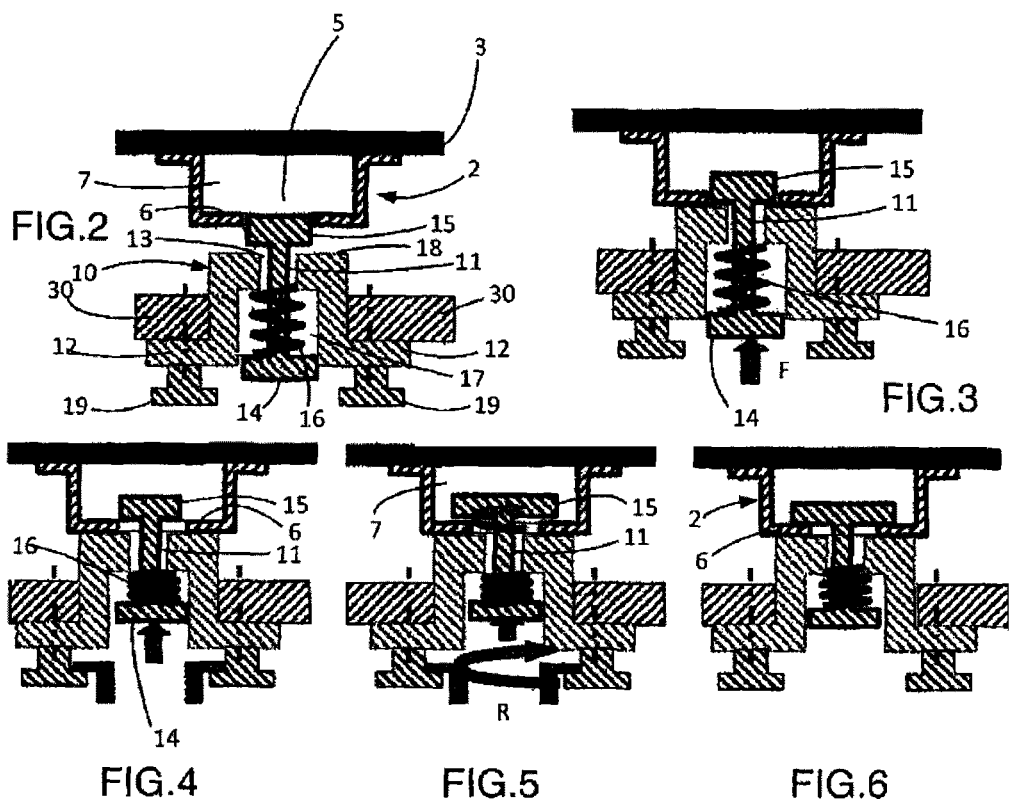
FIGS. 2 to 6 schematically depict a device for removably attaching the battery to a motor vehicle in several configurations corresponding to various phases of a method for mounting a battery on a motor vehicle.

FIG. 2 depicts a configuration in which the two, upper 2 and lower 10, parts of the removable-attachment device 1 are unlocked and independent of one another, the battery tray 30 being secured to the lower part 10 of the device and thus detached from the motor vehicle.

FIG. 3 depicts the first step E1 of the mounting device, in which step the lower part 10 of the attachment device, which has been brought up under the upper part 2, receives a vertical thrusting action F on the piston 14, causing a translational movement of the lock 15 via the rotation spindle 11, so that it enters the lock receptacle of the upper part 2 of the device through the opening 5, against the opposing action of the elastic means 16 which tends to oppose this upward movement of the lock 15. FIG. 4 depicts the configuration of the attachment device 1 at the end of this first step E1, in which the lock 15 is completely positioned above the horizontal lower wall 6 of the lock receptacle.

FIG. 5 illustrates the second essential step in the mounting method, which consists in a rotation R of the spindle 11 so as to cause the lock 15 to rotate. For that, the rotation spindle 11 comprises a means 20 of connection in its lower part allowing it to be turned using a tool. This rotation R alters the orientation of the lock 15 to a configuration in which it remains locked within the hollow volume 7 of the upper part 2 of the device, without being able to escape through the lower opening 5. FIG. 6 illustrates the final locked configuration of the device, in which configuration the elastic means 16 exerts a downward force on the lock 15, which thus presses against the lower surface 6 of the upper part 2 of the device 1, ensuring that the lower part 10 of the device remains locked and therefore that the battery remains locked to the motor vehicle.

Advantageously, a tension of around 12 000 N and preferably of at least 8000 N is applied to the lock in the vertical direction and guarantees that the battery is held firmly under all normal conditions of operation of a motor vehicle. This tension may advantageously be combined with a high coefficient of friction between the lock and the lock receptacle thus improving the retention of the device and preventing any horizontal movement. This coefficient of friction may advantageously be greater than or equal to 0.15.

The invention also relates to the method of mounting a battery on a vehicle using a removable-attachment device, as described hereinabove. This method therefore comprises the following two essential steps:

E1: vertical upward pressure so as to insert the lock 15 into a housing 7; then, E2: rotation of the lock 15.

The first step E1 may simply involve pushing the piston 14 to cause a translational movement thereof, against the force of the elastic means 16. The second step E2 may consist of a turning of the lock 15 through a quarter of a turn or even through some other amount less than or equal to one turn.

The method is carried out using a tool to generate very high forces making it possible to achieve good locking and retention. The method therefore comprises a prior step E0 of attaching the tool to the attachment elements 19, which serve to react the thrusting force of the tool against the piston 14 to provide a support that allows the tool to apply the required thrusting force. This then avoids the transference of the thrusting force to the elements connected with the attachment device, particularly the motor vehicle. Specifically, these load reacting means allow the very high thrust needed to provide a very high locking tension in the system to be applied without breaking the electric vehicle. Specifically, thanks to the coupling between these load reacting means and the tool that applies a significant pressure to the piston, load is transferred internally through the electric vehicle without damaging it.

Naturally, the mounting method also comprises a prior step of connecting the battery tray 30 to one or more lower part(s) of an attachment device and the offering-up of that assembly somewhere close to its final location on the motor vehicle.

The battery tray 30 is removed in the opposite way, all the steps of the mounting method being reversible.

Figure 7:
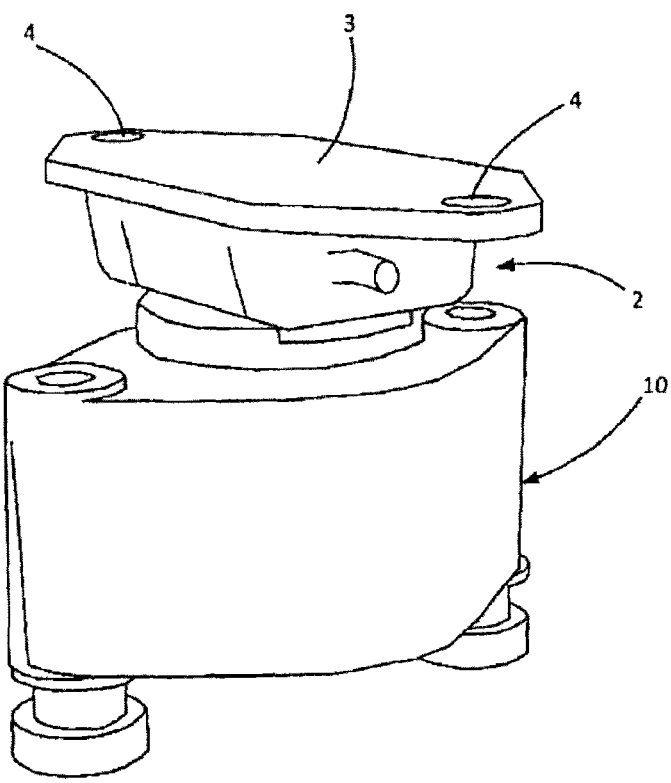
FIG. 7 is a perspective side view of a device for removably attaching a battery to a motor vehicle according to one embodiment of the invention.
Figure 8:
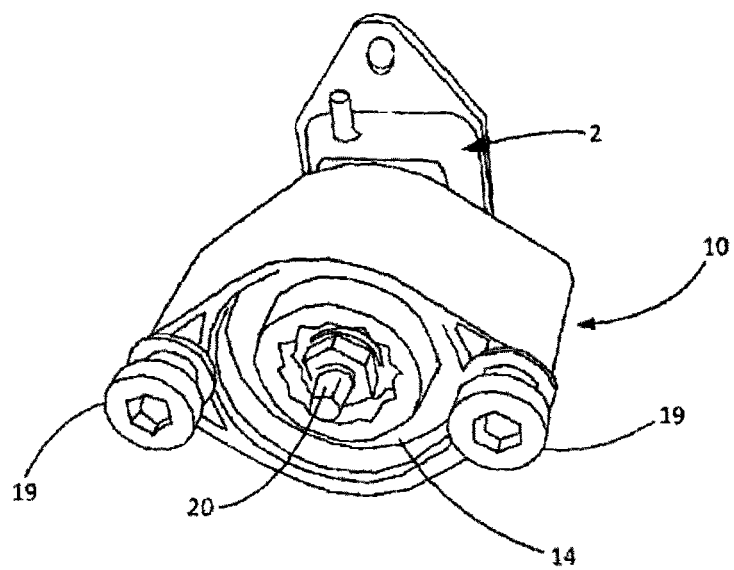
FIG. 8 is a perspective view from beneath of the device for removably attaching a battery to a motor vehicle according to the embodiment of the invention.
Figure 9:
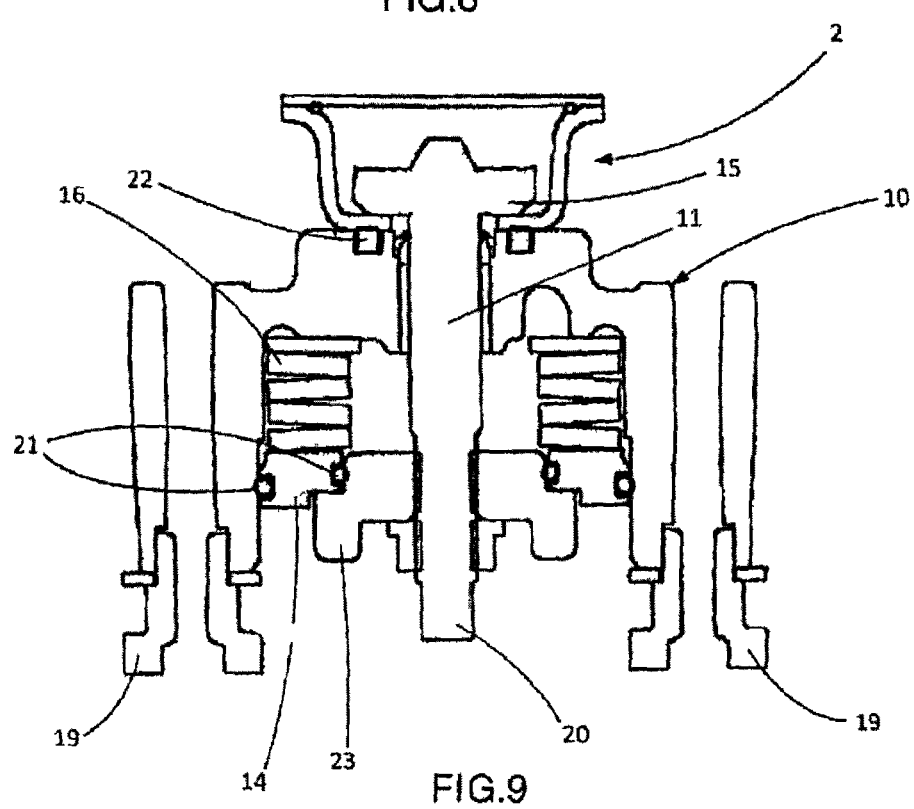
FIG. 9 is a schematic sectional side view of the device for removably attaching a battery to a motor vehicle according to the embodiment of the invention.

FIGS. 7 to 9 more specifically illustrate the device for the removable attachment of a battery according to the embodiment of the invention. This device therefore comprises an upper part 2 collaborating with a lower part 10, as described above. This embodiment more specifically shows the elements involved in performing the locking function. The central spindle 11 is mounted with the ability to rotate and to effect a translational movement and comprises a lock 15 at its end, forming a T-shaped assembly. It additionally comprises an actuating means 20 at its lower end, which may take the form of a cylindrical rod having a flat part that allows it to be turned by a tool comprising a wrench of corresponding shape. An elastic means 16, formed for example of spring washers of the "Belleville" type, rests firstly on the upper part of the body of the lower part of the device forming the hollow volume and secondly in their lower part on a piston 14 in the form of a plateau, collaborating with a stop 23 separate from the plateau and secured to the rotation spindle. Seals 21 are fitted around the plateau piston 14 in order to seal the device at the connections between each piston 14 and the exterior wall of the lower part 10 of the device and between the piston 14 and the stop 23. Thus, these seals 21 seal the interior hollow volume 17 of the lower part 10 of the device in the lower part of this volume. When the piston 14 comes to rest against the stop 23 under the force of the elastic means, it prevents any movement of the rotation spindle 11 and of the lock 15 because it presses the lock 15 firmly against the surface 18 of the body of the lower part. Before carrying out a method of locking or unlocking the lower part 10 of the device with respect to its upper part 2, i.e. before performing a method for mounting or removing a battery, it is necessary to apply thrust to the piston 14 in order to disengage the device by freeing the lock 15 of the load applied by the elastic means 16, via the stop 23. Following this disengagement, it is possible to actuate the lock 15 in the two complementary, rotational and translational, movements mentioned above.

In addition, a sealing ring with lips 22 is positioned around the spindle 11 in the region of the upper opening 13 to provide sealing of the lower part 10 at its top. Two attachment elements 19 for attaching a tool that performs the locking and unlocking are distributed symmetrically about the lock in order to keep the tool stable. These attachment elements 19 take the form of mushrooms, are readily accessible, are of a shape that is easy to clean, are able to withstand the high levels of stress to which they are subjected and are not very bulky. As an alternative, the attachment means could take any other form.

Naturally, the invention is not restricted to the specific geometry of the embodiment described hereinabove by way of nonlimiting example. Thus, the geometry of the piston 14, of the lock 15, of the elastic means 16, of the lock receptacle 5, 6, 7 could adopt other forms without departing from the concept of the invention. The female and male parts of the upper part 2 of the attachment device and of the lower part 10 of the same device respectively may be swapped over, the lock then belonging to the upper part and the lower part forming a lock receptacle. More generally, any geometry is conceivable for achieving collaboration between the two components of the attachment device through a double movement of vertical translation and of rotation about a vertical axis.

Finally, the solution of the invention affords the following advantages:
- it allows a battery to be replaced quickly, in a specialist exchange station for example;
- it holds the battery securely when the vehicle is moving along, even in the event of sharp deceleration;
- it allows a great many battery exchanges with a low level of wear;
- it is able to operate with a spread of a few millimeters in a horizontal plane between the battery and the fixed upper part of the attachment device.

The invention claimed is:

1. A device for removably attaching a motor vehicle battery, comprising:
   an upper part comprising a means of attachment to a motor vehicle;
   a lower part disconnectable from the upper part, the lower part comprising a top portion, a hollow housing extending downward from the top portion, and a flat portion extending radially outward from the hollow housing, the top portion having an upper face that directly contacts the upper part when the upper part and lower part are locked together and is separated from the upper part when the upper part and lower part are unlocked, and the flat portion includes a flat surface on which the battery can rest vertically, the lower part being positioned entirely below the upper part when the upper part and lower part are locked together; and
   a lock connected to a rotation spindle, the rotation spindle being connected to a piston on which there acts an elastic means, the elastic means being positioned below and in contact with a lower face of the top portion of the lower part, so as to allow the upper and lower parts to be locked together and unlocked from one another by a translational and a rotational movement of the lock, wherein
   the top portion of the lower part is positioned entirely above the flat portion of the lower part, and
   the elastic means is positioned within the hollow housing and entirely above the flat portion when the upper and lower parts are locked together.

2. The device for removably attaching a motor vehicle battery as claimed in claim 1, wherein the elastic means comprises at least one spring, or at least one spring comprising spring washers of Belleville type.

3. The device for removably attaching a motor vehicle battery as claimed in claim 1, wherein the rotation spindle is substantially vertical and the piston is capable of a translational movement substantially parallel to the rotation spindle.

4. The device for removably attaching a motor vehicle battery as claimed in claim 1, further comprising at least one attachment element for a tool capable of reacting load when the device is operated using this tool, the attachment element extending from the lower part of the device.

5. The device for removably attaching a motor vehicle battery as claimed in claim 1, wherein the upper part comprises a substantially flat lower surface comprising an opening onto a hollow volume forming a lock receptacle.

6. The device for removably attaching a motor vehicle battery as claimed in claim 5, wherein the hollow housing of the lower part comprises a volume in which the rotation spindle is mounted with ability to rotate, within which the piston is located, within which is located the elastic means connected to the piston so as to exert a force that opposes upward movement of the piston.

7. The device for removably attaching a motor vehicle battery as claimed in claim 6, wherein the top portion of the lower part comprises an opening through which the rotation spindle passes, the lock being situated above the opening in the top portion of the lower part.

8. The device for removably attaching a motor vehicle battery as claimed in claim 1, wherein the elastic means applies a tension greater than or equal to 8000 N on the lock and/or the coefficient of friction between the lock and a part in contact with the lock in the locked configuration is greater than or equal to 0.15.

9. A motor vehicle comprising:
a power supply battery; and
at least one device as claimed in claim 1 for removably attaching its battery.

10. The device for removably attaching a motor vehicle battery as claimed in claim 1, wherein the flat surface is spaced apart from the upper part.

11. The device for removably attaching a motor vehicle battery as claimed in claim 1, wherein a first end of the elastic means contacts the lower face of the top portion of the lower part and a second end of the elastic means, which is opposite to the first end, contacts a top face of the piston.

12. The device for removably attaching a motor vehicle battery as claimed in claim 11, wherein the piston is positioned within the hollow housing and entirely below the elastic means when the upper and lower parts are locked together.

\* \* \* \* \*